United States Patent [19]
Bregenzer

[11] 3,724,148
[45] Apr. 3, 1973

[54] CABLE RECEIVING FLOOR CONDUIT

[75] Inventor: Otto Bregenzer, St. Gallen, Switzerland

[73] Assignee: O. Bregenzer & Co., St. Gallen, Switzerland

[22] Filed: Aug. 28, 1970

[21] Appl. No.: 67,780

[30] Foreign Application Priority Data

Sept. 3, 1969 Switzerland..................G 13448/69

[52] U.S. Cl. .....................52/221, 52/122, 174/49, 174/101
[51] Int. Cl. ............................................E05f 17/08
[58] Field of Search........52/220, 221, 122, 588, 294; 174/48, 49, 95, 101; 220/34, 3.7, 3.9; 138/111, 117

[56] References Cited

UNITED STATES PATENTS

| 3,420,017 | 1/1969 | Brugger et al. | 52/221 |
| 3,334,455 | 8/1967 | Russell | 52/122 |
| 3,471,629 | 10/1969 | O'Leary | 174/101 X |
| 1,956,879 | 5/1934 | Sharp | 52/221 X |
| 333,119 | 12/1885 | Ephraim | 138/111 |
| 2,888,113 | 5/1959 | Schwartz et al. | 52/28 |
| 3,190,041 | 6/1965 | Kimball | 52/294 |
| 3,420,018 | 1/1969 | Fork | 52/221 |

FOREIGN PATENTS OR APPLICATIONS

| 403,906 | 6/1966 | Switzerland | 52/220 |

Primary Examiner—Alfred C. Perham
Attorney—McGlew and Toren

[57] ABSTRACT

A floor conduit for laying cables and pipes and similar structures comprises at least one substantially U-shaped section which is closed by a cover. The U-shaped section includes upright longitudinal walls and the outer ones have downwardly opening hooks at each top side which provide a level top support for the floor structure and which also supply an engagement surface for engaging over a supporting beam supporting the conduit.

9 Claims, 4 Drawing Figures

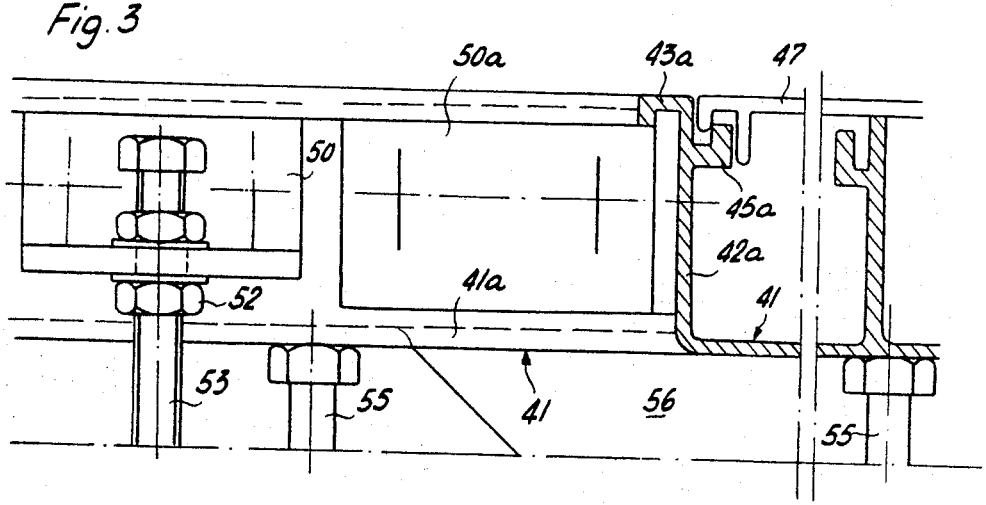
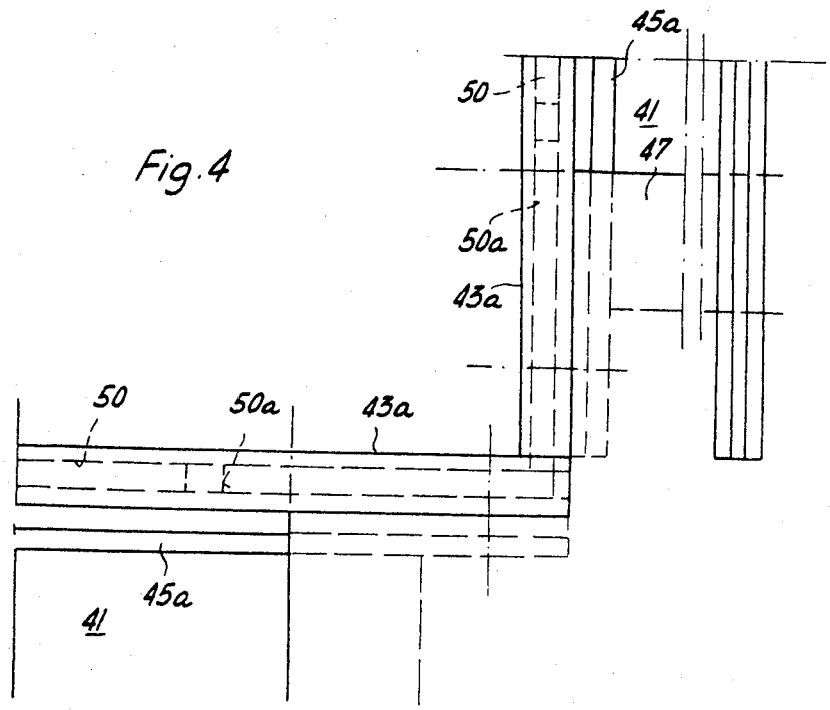

CABLE RECEIVING FLOOR CONDUIT

SUMMARY OF THE INVENTION

This invention relates in general, to the construction of devices for accommodating cables and pipes and similar structures, and in particular, to a new and useful floor conduit for laying cables and pipes which includes a U-shaped section having exterior walls with top surfaces forming downwardly extending hooks for engaging and supporting the conduit and for supporting a wall structure thereabove.

Conduits for receiving cables and pipes are known which present in cross section retangular U-shaped profiles having upwardly open sides which are closed by a removable cover. If several types of cables or pipes are to be installed, this is usually done in separate conduit containers which are separated by vertical partitions located within the conduit profile. The support of the known floor conduits is normally effected directly on a mortar or concrete foundation either in the still plastic state of the foundation or by means of suitable underlay wedges in order to achieve an installation of the conduits which is true to level. This method of installation is relatively complicated and requires much care.

in order to avoid the above disadvantages, the invention provides a conduit with upright longitudinal walls at the outer sides which have outwardly and downwardly bent portions forming downwardly opening hooks. These hooks cooperate with the carrying or supporting members which are supported so as to be adjustable in height on the floor construction and they support the conduit in a similar manner. If the conduit with a single U-shaped profile or cross section is involved, the hooks are preferably formed at their upper longitudinal edge of both outer profile walls with the hook formations which spans or engages around one leg of a carrying angle, the latter being supported by means of set screws in the floor construction. The upper hook portion advantageously is in alignment with the top side of the cover for the conduit so that it forms a level extension of the cover and provides a bearing for the floor covering which is to by applied thereabove. To fix the installation level of the carrying angles and of the conduit and also to provide a bearing for the conduit, there are provided head screws which are arranged, for example, in the vertical longitudinal middle plane of the conduit in the vertical joint plane between several conduits which form the overall combined structure or assembly. The screws are secured into the substructure and they are adjustable in height. The cover for the conduit is constructed such that each end includes downwardly extending spaced wall portions defining a recess which receives upward projections of hook elements defined at the interior of the outer walls of the conduit structure. Advantageously, the cover is supported over the projection on suitable packing material.

Accordingly, it is an object of the invention to provide an improved conduit or container for receiving articles such as cables, pipes and the like and which include an elongated member having a U-shaped section with at least the outer walls of the cross section having portions extending outwardly and downwardly to form a hook for engaging a supporting member and for also defining a bearing surface for receiving a floor thereabove.

A further object of the invention is to provide a conduit device which includes a rectangular container having outer walls with outwardly directed supporting beam engaging portions and inwardly and upwardly directed receiving recesses for receiving projections of a cover therefore and which also includes at least one additional partition wall and which may be made up of a single piece of plurality of interconnected individual conduit members which are joined together at their common wall by interengaging hook portions formed on the respective individual elements.

A further object of the invention is to provide a conduit particularly for pipes and cables which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 3 is a partial side elevational and partial sectional view of a crossing junction of the embodiment of the invention indicated in FIG. 1; and FIG. 4 is a top plan view of the junction indicated in FIG. 3.

GENERAL DESCRIPTION OF THE PREFERRED EMBODIMENTS

Figure 1:
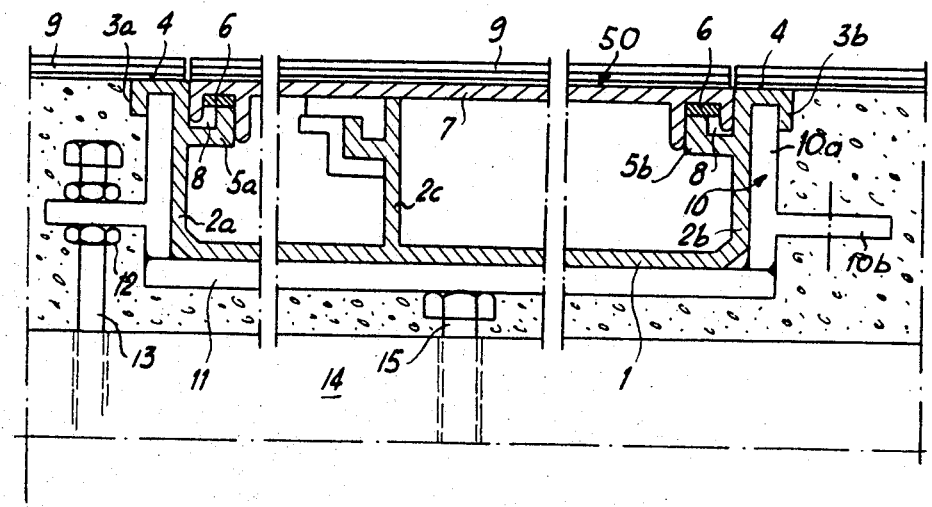
FIG. 1 is a partial vertical sectional view of a floor conduit constructed in accordance with the invention.

Referring to the drawings in particular, the invention embodied therein in FIG. 1, comprises a floor conduit assembly generally designated 50 which includes a substantially rectangular container which is elongated in a longitudinal direction and has a substantially U-shaped cross section and is advantageously made of a material such as aluminum. In the embodiment of FIG. 1, the assembly 50 is divided into two adjacent chambers by a vertical partition 2c which extends parallel to the side walls or outer walls 2a and 2b. The free edge portions of each of the two side walls 2a and 2b are bent at right angles outward and then downward so as to form a downwardly opening hook 3a and 3b, respectively. Each hook 3a and 3b includes a flat top side 4 which lies in the opening plane of the conduit 50. On the inside of the walls 2a and 2b there are provided upwardly opening hooks 5a and 5b, respectively, which are formed by an inwardly extending flange for each which is bent upwardly at right angles. Each of the upwardly extending hooks 5a and 5b engages within a groove 8 defined between two parallel downwardly extending ribs formed at each end of a cover 7. Suitable packing such as a strip 6 is inserted between the projecting hooks 5a and 5b and the accommodating recesses 8.

The top side of the cover 7 is aligned with the top side 4 of the outer hooks 3a and 3b and together these surfaces serve as bearings for a floor covering 9. The floor covering 9 is applied after the conduit is installed within the foundation and the cover is placed in position.

The conduit assembly 50 is supported by engagement of the outer hook portions 3a and 3b at the respective sides, or ends, over the upper end face of a vertical leg 10a of a carrying angle 10. A carrying angle is arranged at each side of the conduit 50 at certain intervals along the length thereof and they are interconnected by cross beams 11 which engaged the conduit from below. The horizontal legs 10b of the carrying angles 10 are supported by means of threaded nuts 12 which are threadably engaged on screw bolts 13 which are secured in the floor substructure 14. Thus, the overall conduit assembly 50 is adequately supported on the floor substructure 14 by means of the hooks 3a and 3b through the carrying angles 10 and the bolts 13.

It is possible to adjust the desired height position of the conduit 1 exactly by adjusting the carrying nuts 12 at the bolts 13 to a desired level. However, this procedure is relatively complicated as it would be necessary to measure the height position exactly for a relatively large number of nuts 12. In order to avoid this several set screws 15 are arranged in the substructure 14 at relatively great intervals along the medium axis the conduit assembly 50. It suffices to bring these set screws 15 into the correct height position before installing the conduit so that the conduit 1 or the carrying angles 10 with the cross beams 11 are placed on the heads of the set screws 15. Then the nuts 12 or the bolts 13 can be brought into the correct end position. Finally the cavity surrounding the conduit 1 is filled with mortar or concrete, after which the floor covering can be applied. As the inner hooks 5a and 5b close the cover 7 and interengage in all sides with the respective receiving grooves or recesses 8 of the cover, the material of the packing strips 6 cannot escape. This ensures a level amount of the cover on the hooks 5a and 5b and hence a satisfactory alignment of the top sides 4 of the hooks 3a and 3b and the top surface of the cover 7. This makes it possible to provide a satisfactory level laying of the floor covering 9 and also a satisfactory laying of the cover at the joints extending along the edge of the cover.

Figure 2:
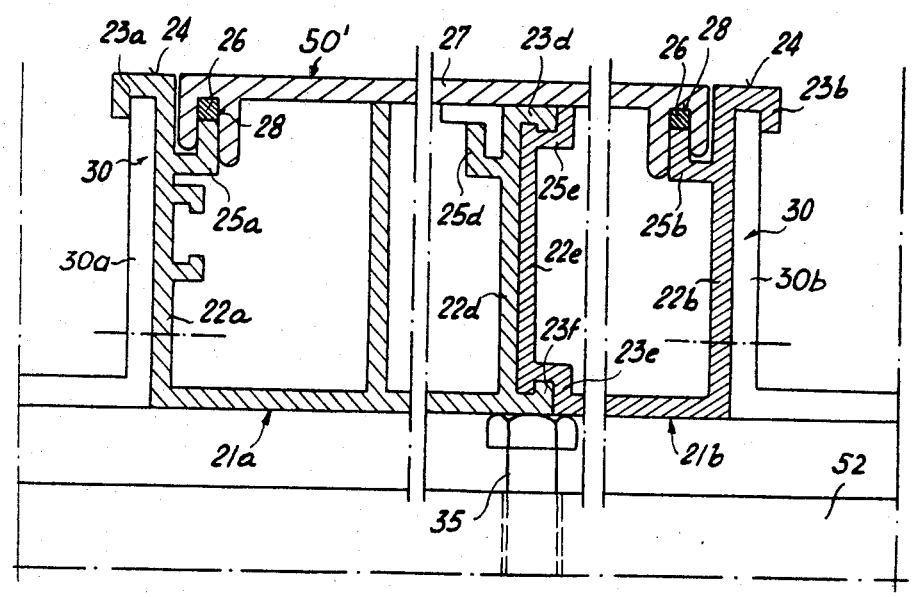
FIG. 2 is a view similar to FIG. 1 showing a plurality of interengaged floor conduits forming an overall conduit assembly of another embodiment of the invention.

In the embodiment of the invention shown in FIG. 2, a conduit assembly 50' comprises two mutually spaced conduits 21a and 21b which lie one alongside the other in abutting contact. The conduit assembly includes outer walls or side walls 22a and 22b which are provided on the inside with an upwardly opening hooks 25a and 25, respectively, for engaging into recesses 28 defined at each end of a cover 27 and with the interposition of a packing strip 26 therebetween. In addition, the free longitudinal upper edges of the side walls 22a and 22b are bent outwardly and downwardly at rignt angles to form downwardly opening hooks 23a and 23b which engage over vertical leg portions 30a and 30b, respectively, of angle members or supports 30. The flat top side 24 of the hooks 23a and 23b is in alignment with the top side of the cover 27 and forms a bearing for the floor covering (not shown). The supporting angles 30 are advantageously supported by means of screw bolts and nuts similar to the embodiment of FIG. 1.

A feature of the construction of FIG. 2 is that the abutting walls 22d and 22e of the respective individual conduits 21a and 21b are interconnected by hook formations which permit only a longitudinal telescoping movement of the two conduits but not a separation thereof in a transverse direction. For this purpose, the wall 22d has an upper longitudinal edge with a downwardly opening hook formation 25d bent at right angles outwardly and downwardly which engages in an upwardly opening inner hook 25e formed at the upper longitudinal edge of the wall 22e. In addition, the hook formation 23f is formed at the lower edge of the wall 22d which engages in a receiving recess formed within a hook formation 23e at the lower edge of the wall 22e. The construction is such that the two conduits are interconnected with each other except against longitudinal displacement and are supported as a whole unit or assembly 50' on the floor structure by the outer hooks 23a and 23b which engage over the angles 30.

An upper inner hook 25d is also provided on the wall 22d which engages with a fastening angle 31 for supporting the cover 27 or it engages with a junction box which is mounted on the angle and not shown. Set screws are provided to fix the installation level and also to control the central support of the relatively wide conduit elements. The set screws 35 are anchored in the foundation 52 for adjustment in height of the assembly 50'.

FIGS. 3 and 4 show crossing points of the conduit profiles of the form as shown in FIG. 1. Outside the crossing point the conduit parts 41 which extend toward the crossing point are supported on the understructure 54 by means of screw bolts 53 and nuts 52. Set screws 55 are provided to fix the installation level and for the central support of the conduits in their longitudinal middle plane. The conduit parts 41 are interconnected by means of vertically arranged carrying angles 50a over which the hook elements 33a of the continuous longitudinal wall 42a of the conduits are engaged. The inner hooks 45a serve for the tight support of the cross shaped common cover 47. In order to be able to pass the cables or pipes in one of the conduit sections which cross at a right angle to the other, without interferring with the cables or pipes in the other crossing section, an adequate cavity 56 must be left under the intersection of the conduit elements. The bottom of the end sections of the two conduits forming the overall conduit line is cut out at a point 41a. It is thus possible to let the pipes or cables from one conduit line pass under the pipes or cables of another conduit line at the crossing point.

Because of the set screws 55, the formation of the floor conduits permits a simple installation true to level and ensures a satisfactory support or connection of the conduits due to the carrying angles. In addition, it gives a satisfactory level bearing of the floor covering owing to the construction of the outer hook portions.

What is claimed is:

1. A floor conduit for laying cables and pipes comprising a conduit having a substantially U-shaped cross-section with a cover closing the top of said U-shaped cross-section, said conduit including outer substantially straight side walls which have top rims forming downwardly opening hooks with a substantially horizontal outwardly extending portion at the top, a downwardly extending portion extending downwardly from the outer end of said outwardly extending portion, a supporting member adapted to be secured in the foundation comprising an angle section with a vertical leg which engages with a respective hook and a horizontal leg, supporting member adjustment means for adjusting the level of said supporting member, said downwardly opening hooks being engaged over said supporting member, said hooks each including said outwardly extending portion with a top surface providing a horizontal surface support and a bottom surface engaged and supported on said vertical leg, a cover covering the top of said conduit and having a surface flush with said bearing surface to provide a level support for a ground covering, said outer walls each including an inwardly and upwardly extending portion on the exterior thereof forming a hook projection, said cover having a recess adjacent the end thereof for receiving the hook projection of said outer wall, said hook projection supporting said cover so that its top surface is flush with said top surface of said outwardly extending portion of said rim.

2. A floor conduit, according to claim 1, wherein said member adjustment means comprises a threaded member carried by said foundation, and means movable along said threaded member and bearing against the said horizontal leg portion of said supporting member for adjustably supporting said supporting member.

3. A floor conduit, according to claim 1, wherein said conduit includes a bottom wall, a foundation for holding said supporting member, and bottom adjustable means carried by said foundation engageable with said bottom wall for adjusting the height of said conduit.

4. A floor conduit, according to claim 1, including a packing strip interposed between said upwardly opening hook and said receiving recess of said cover.

5. A floor conduit, according to claim 1, including a crossing conduit extending at substantially right angles to said conduit wherein said crossing conduit includes an outer wall with a hook engageable with said supporting member, a portion of the bottom of the said conduit and said crossing conduit being cut out.

6. A floor conduit, according to claim 1, wherein said conduit includes an intermediate partition wall dividing the interior of said conduit having an upwardly opening receiving socket at the upper end thereof.

7. A floor conduit, according to claim 1, including a supporting beam extending between the supporting members at each side of said conduit, and a supporting adjustable bolt member located below said supporting beam and engageable therewith for regulating the level of said supporting beam with said conduit.

8. A floor conduit, according to claim 1, wherein said conduit comprises a plurality of separate conduits adjacent ones having abutting walls with interengageable projections and sockets at each top and bottom end forming longitudinally extending engagement tongues and grooves, said walls being interengaged and said separate conduits being shiftable longitudinally but not laterally.

9. A floor conduit, according to claim 1, wherein said conduit comprises two separate conduit elements said conduit elements having abutting walls which are interengaged for sliding longitudinal movement, the exterior walls of said abutting conduits having upwardly extending projections and a cover fitted over all of said conduits and having end portions forming recesses engageable over the respective projections.

* * * * *